United States Patent
Roe et al.

(10) Patent No.: US 10,161,308 B2
(45) Date of Patent: Dec. 25, 2018

(54) SYSTEM FOR DETERMINING DAMAGE BASED ON LINER POLISH

(71) Applicant: Caterpillar Inc., Peoria, IL (US)

(72) Inventors: Austin P. Roe, East Peoria, IL (US); Scott A. Thompson, Washington, IL (US); Anthony T. Petrou, Peoria, IL (US); Michael J. Campagna, Chillicothe, IL (US); Steven C. Zoz, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 159 days.

(21) Appl. No.: 15/224,362

(22) Filed: Jul. 29, 2016

(65) Prior Publication Data

US 2018/0030891 A1    Feb. 1, 2018

(51) Int. Cl.
| | | |
|---|---|---|
| *F02B 77/08* | (2006.01) |
| *F02D 35/02* | (2006.01) |
| *F02D 17/04* | (2006.01) |
| *F02D 41/22* | (2006.01) |

(52) U.S. Cl.
CPC ............ *F02B 77/083* (2013.01); *F02D 17/04* (2013.01); *F02D 35/02* (2013.01); *F02D 41/22* (2013.01)

(58) Field of Classification Search
CPC ........ F02B 77/083; F02B 77/08; F02D 14/04; F02D 35/02; F02D 2200/1015; F02F 1/004; F02F 10/04
See application file for complete search history.

(56) References Cited

U.S. PATENT DOCUMENTS

| | | | | |
|---|---|---|---|---|
| 5,258,930 A | * | 11/1993 | Fukuyoshi | G01B 7/10 701/34.4 |
| 6,334,085 B1 | * | 12/2001 | Kawamura | G01M 15/046 701/115 |
| 2011/0290004 A1 | * | 12/2011 | Korenaga | F01M 13/023 73/35.01 |
| 2015/0345421 A1 | | 12/2015 | Gniesmer | |
| 2018/0030913 A1 | * | 2/2018 | Roe | F02D 41/22 |
| 2018/0030914 A1 | * | 2/2018 | Roe | F02D 41/22 |

* cited by examiner

*Primary Examiner* — Long T Tran
*Assistant Examiner* — Gonzalo Laguarda
(74) *Attorney, Agent, or Firm* — Oblon, McClelland, Maier & Neustadt

(57) ABSTRACT

A machine may comprise a memory configured to store liner polish information; and an electronic control module. The electronic control module may be configured to: determine a load factor based on an amount of load on the engine; determine an end of injection factor associated with the engine; determine a liner polish rate based on the load factor and the end of injection factor; obtain, from the liner polish information stored in the memory, information identifying a previous amount of damage to the engine; determine an amount of time between a current time and a time when the previous amount of damage was calculated; calculate a current amount of damage to the engine based on the previous amount of liner polish, the amount of time, and the liner polish rate; and take a remedial action based on the current amount of damage.

18 Claims, 6 Drawing Sheets

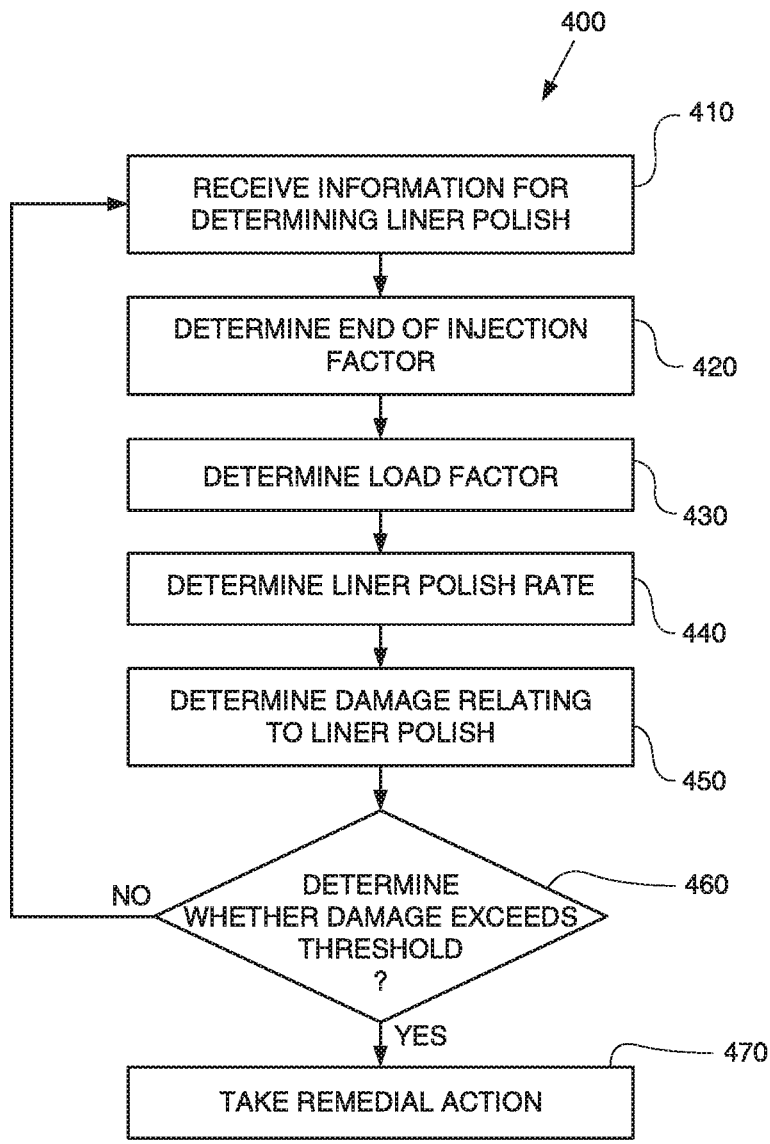

SYSTEM FOR DETERMINING DAMAGE BASED ON LINER POLISH

TECHNICAL FIELD

The present disclosure relates generally to a system for determining piston damage and, more particularly, to a system for system for determining liner polish rate and determining an amount of damage based on the liner polish rate.

BACKGROUND

An internal combustion engine may include an engine block defining a plurality of cylinder bores, a crankshaft rotatably supported in the engine block, and pistons connected to the crankshaft and configured to reciprocate within the cylinder bores. Typically, each piston may include a skirt pivotally connected to the crankshaft, and a crown connected to a distal end of the skirt. A combustion bowl may be formed on an end face of the crown to receive injected fuel, and annular grooves may be formed in an outer surface of the crown to receive associated rings. A cooling passage may be annularly formed inside the crown, between the bowl and the cooling passage, to circulate engine oil that may cool the bowl.

During operation of the engine, fuel and air is combusted inside the cylinder bore (and inside the bowl), to generate heat and pressure that is turned into mechanical work. Over a period of time, hot combustion gases may reach a cylinder liner (of the cylinder bores) and may either evaporate oil, burn the oil, or add soot or fuel to the oil. As a result, liner polish may occur. For example, a portion of the cylinder liner may become polished (or, in other words, the portion of the cylinder liner may correspond to a polish area). Liner polish (or a level of severity of the liner polish) may lead piston damage and/or damage of other components of the internal combustion engine.

U.S. Patent Application Publication No. 20150345421 (hereinafter the '421 publication) is directed to a piston of an internal combustion engine. The piston may include a piston crown with annular grooves, a combustion chamber bowl, and a piston skirt with a pin bore to receive a pin. However, the '421 publication does not disclose monitoring or determining liner polish.

SUMMARY

In some embodiments, a control system, for determining an amount of damage to an engine, may comprise a memory configured to store liner polish information; and an electronic control module. The electronic control module may be configured to: determine a load factor based on an amount of load on the engine; determine an end of injection factor associated with the engine; determine a liner polish rate based on the load factor and the end of injection factor; obtain, from the liner polish information stored in the memory, information identifying a previous amount of damage to the engine; determine an amount of time between a current time and a time when the previous amount of damage was calculated; calculate a current amount of damage to the engine based on the previous amount of liner polish, the amount of time, and the liner polish rate; and take a remedial action based on the current amount of damage.

In some embodiments, a method, for determining an amount of damage to an engine, may comprise determining, by an electronic control module, a load factor based on an amount of load on the engine; determining, by the electronic control module, an end of injection factor associated with the engine; determining, by the electronic control module, a liner polish rate based on the load factor and the end of injection factor; obtaining, by the electronic control module and from liner polish information stored in a memory, information identifying a previous amount of damage to the engine; calculating, by the electronic control module, an amount of time between a current time and a time when the previous amount of damage was calculated; calculating, by the electronic control module, a current amount of damage to the engine based on the previous amount of liner polish, the amount of time, and the liner polish rate; and taking, by the electronic control module, a remedial action based on the current amount of damage.

In some embodiments, a machine may comprise a memory configured to store liner polish information; and an electronic control module. The electronic control module may be configured to: determine a load factor based on an amount of load on the engine; determine an end of injection factor associated with the engine; determine a liner polish rate based on the load factor and the end of injection factor; obtain, from the liner polish information stored in the memory, information identifying a previous amount of damage to the engine; determine an amount of time between a current time and a time when the previous amount of damage was calculated; calculate a current amount of damage to the engine based on the previous amount of liner polish, the amount of time, and the liner polish rate; and take a remedial action based on the current amount of damage.

BRIEF DESCRIPTION OF THE DRAWINGS

FIG. 4 is a flow chart of an example process performed by the system of FIG. 3 for determining liner polish and determine damage relating to the liner polish.

DETAILED DESCRIPTION

Figure 1:
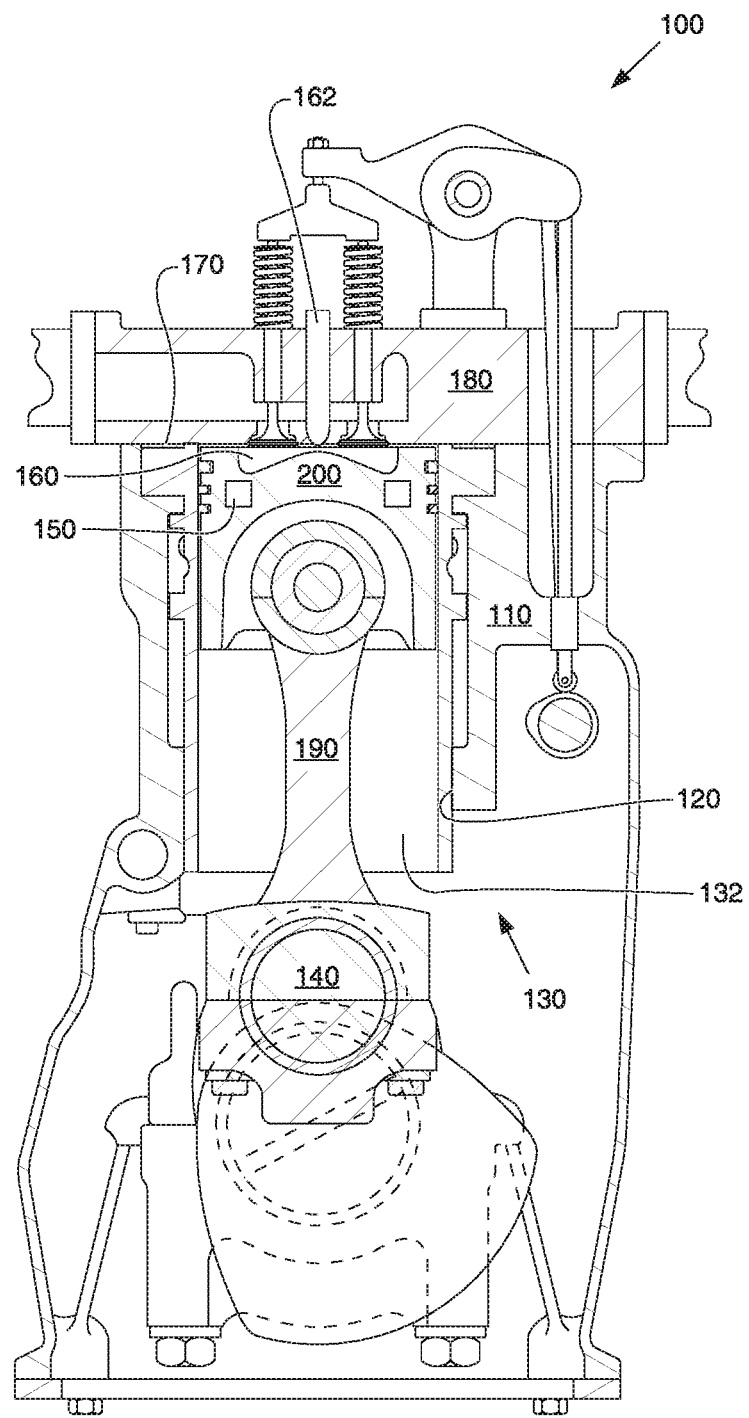
FIG. 1 is a cross-sectional view of an engine according to an embodiment of the present disclosure.

FIG. 1 is a cross-sectional view of an exemplary internal combustion engine 100 (or engine 100) according to an embodiment of the present disclosure. In some implementations, engine 100 may include a block 110 (or engine block 110) defining one or more bores 120 (or cylinder bores 12). A hollow liner 130 (or cylinder liner 130 or liner 130) may be disposed within each of the one or more bores 120, and a head 180 (or cylinder head 180) may be connected (e.g., by way of a gasket 170) to block 110 to close off an end of a bore 120, of the one or more bores 120, and cylinder liner (or liner) 130. A piston 200 may be slidably disposed within liner 130, and piston 200 together with liner 130 and head 180 may define a combustion chamber 160. A fuel injector 162 may inject or spray fuel 164 in combustion chamber 160. Piston 200 may include an annular cooling passage 150. Piston 200 and annular cooling passage 150 are described in more detailed below. In some implementations, engine 100 may include one or more combustion chambers 160 and the one or more combustion chambers 160 may be disposed in an "in-line" configuration, in a "V" configuration, in an opposing-piston configuration, or in any other suitable configuration.

In some implementations, piston 200 may be configured to reciprocate within liner 130 between a top-dead-center (TDC) position and a bottom-dead-center (BDC) position during a combustion event occurring with chamber 160. More particularly, piston 200 may be pivotally connected to a crankshaft 140 by way of a connecting rod 190 (or rod 190), so that a sliding motion of each piston 200 within cylinder liner 130 results in a rotation of crankshaft 140. Similarly, a rotation of crankshaft 140 may result in a sliding motion of piston 200. In a four-stroke engine, piston 200 may move through four full strokes to complete a combustion cycle of about 720° of crankshaft rotation. These four strokes include an intake stroke (TDC to BDC), a compression stroke (BDC to TDC), a power stroke (TDC to BDC), and an exhaust stroke (BDC to TDC). As explained above, fuel 164 (e.g., diesel fuel, gasoline, gaseous fuel, etc.) may be injected into combustion chamber 160 by fuel injector 162 during the intake stroke. The fuel may be mixed with air and ignited during the compression stroke. Heat and pressure resulting from the fuel/air ignition may then be converted to useful mechanical power during the ensuing power stroke. Residual gases may be discharged from combustion chamber 160 during the exhaust stroke.

In some implementations, the different positions of piston 200, during combustion, may be associated with timing during a combustion cycle. For example, the TDC position may be associated with (or may correspond to) an earlier timing while the BDC position may be associated with (or may correspond to) a latter timing.

The number of components (of engine 100) shown in FIG. 1 is provided for explanatory purposes. In practice, there may additional components, fewer components, different components, or differently arranged components than those shown in FIG. 1.

Figure 2A:
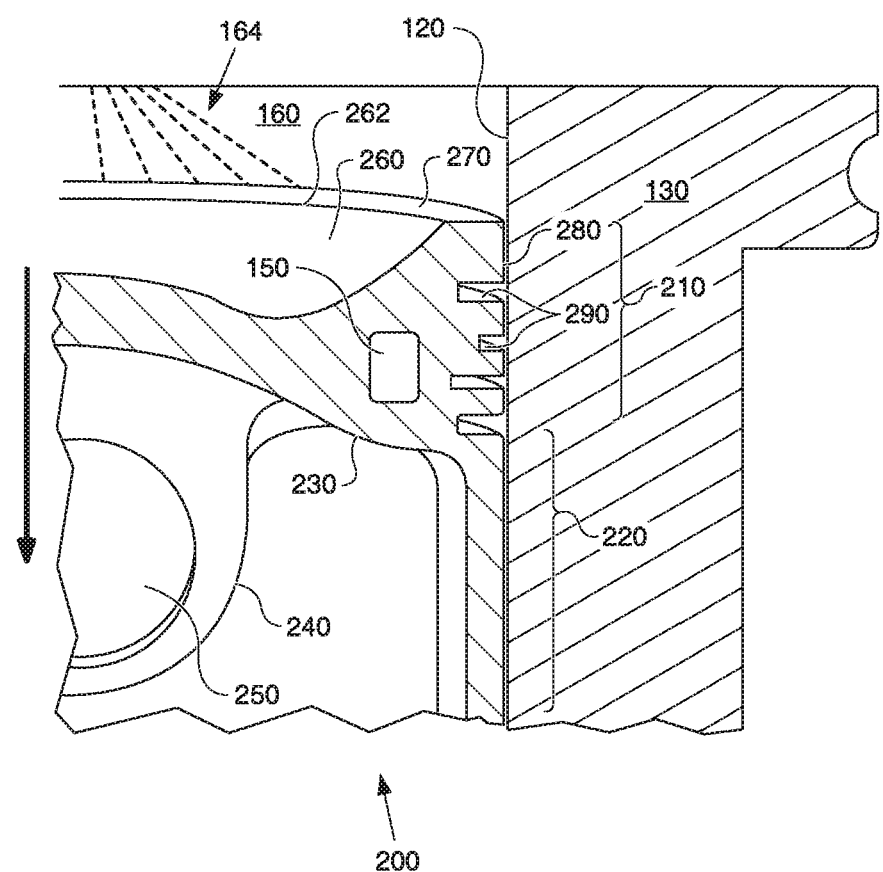
FIG. 2A is a cross-sectional view of a piston of the engine of FIG. 1.

FIG. 2A is a cross-sectional view of piston 200 of engine 100 of FIG. 1. In some implementations, piston 200 may generally consist of an integral crown 210 (or crown 210), a skirt 220, and undercrown 230. Skirt 220 be generally tubular (i.e., hollow and cylindrical), with a bearing support 240 (or support 240) formed therein. Support 240 may be configured to receive a wrist pin that pivotally connects piston 200 to rod 190 (referring to FIG. 1). Support 240 may define a pin bore 250. Piston pin bore (or piston bore) 250 may receive a piston pin (not shown). Crown 210 may be formed at end of piston 200 opposite support 240, and may include an end face 270 and an annular side surface 280. Undercrown 230 may correspond to an area under crown 210. One or more ring grooves 290 may be cut into annular side surface 280 and configured to receive corresponding oil rings (not shown), compression rings (not shown), or another type of piston ring known in the art. A bowl 260 may be recessed within end face 270, and a rim 262 (bowl rim 262) may be located at an intersection of bowl 260 and end face 270. An annular cooling passage 150 may be formed in crown 210 between bowl 260 and grooves 290. The circulation of engine oil or another coolant through passage 150 during operation of engine 100 may reduce a temperature of crown 210. With this configuration, the engine oil may function as a heat sink, causing combustion heat from inside bowl 260 to pass radially outward and downward in a direction toward annular cooling passage 150.

As explained above, fuel injector 162 may inject or spray fuel 164 in combustion chamber 160. As illustrated in FIG. 2A, piston 200 may be in a position that prevents cylinder line 130 from being exposed to fuel 164 (or a portion of fuel 164) and, thereby, may be in a position that shields cylinder liner 130 from fluid 164 (or from a portion of fluid 164). For example, as illustrated in FIG. 2A, piston 200 may be in (or close to) a TDC position and may be transitioning to a BDC position.

Figure 2B:
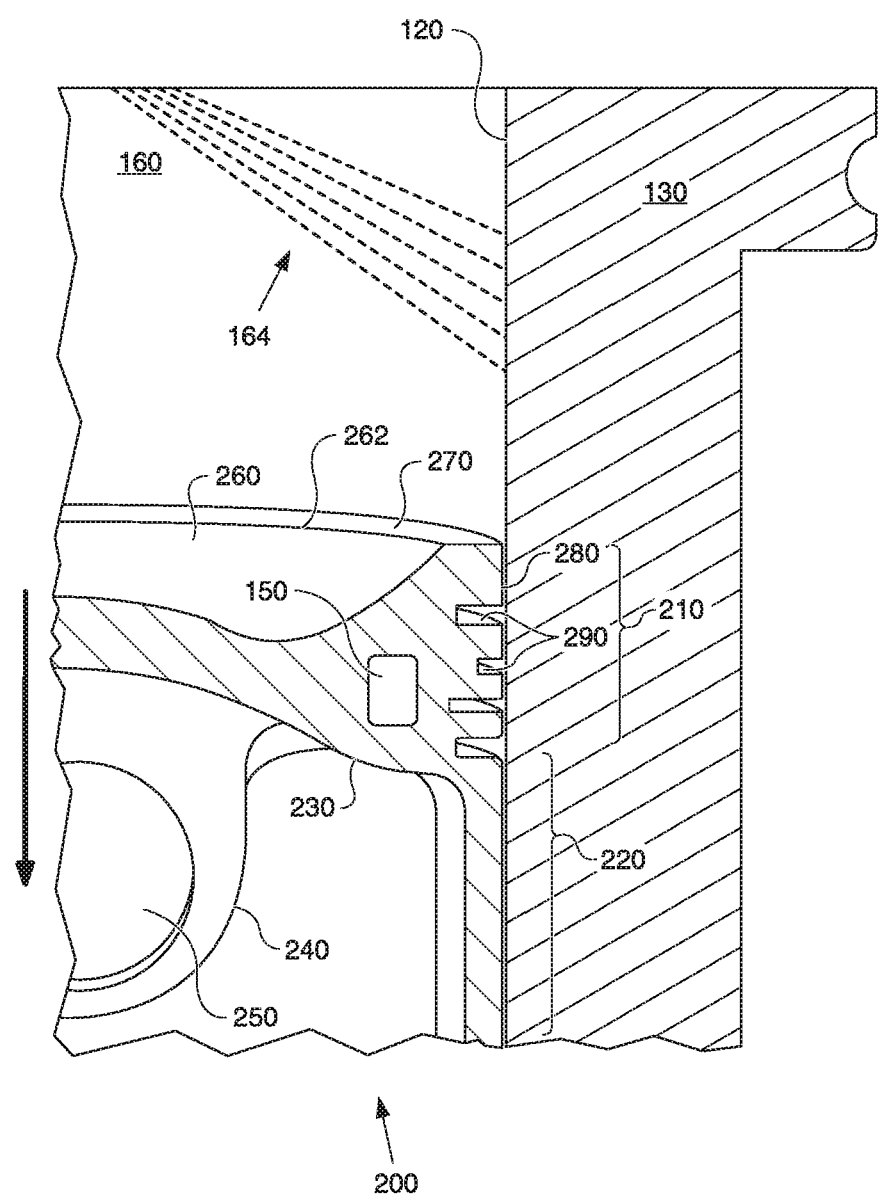
FIG. 2B is another cross-sectional view of the piston of FIG. 2A.

FIG. 2B is another cross-sectional view of piston 200 of FIG. 2A. As illustrated in FIG. 2B, piston 200 may no longer be in a TDC position and, instead, may be close to a BDC position. In this regard, piston 200 may be in a position that exposes cylinder liner 130 (or a portion of cylinder liner 130) to fuel 164. For example, as illustrated in FIG. 2A, fuel 164 may be sprayed on cylinder liner 130 (or portion(s) of cylinder liner 130). Over a period of time, hot combustion gases may reach portion(s) of cylinder liner 130 exposed to fluid 164. As a result, liner polish may occur at the portion(s) of cylinder liner 130.

Figure 2C:
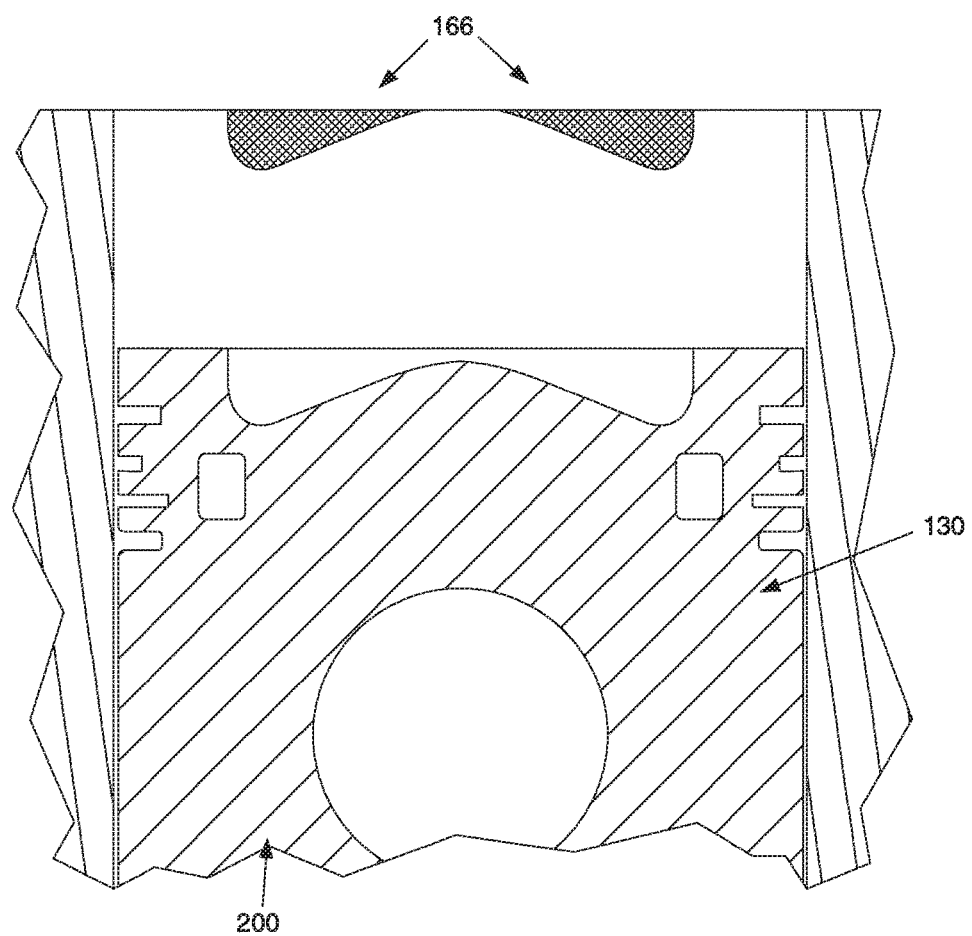
FIG. 2C is another cross-sectional view of the piston of FIG. 2B with liner polish.

FIG. 2C is another cross-sectional view of piston 200 of FIG. 2B with liner polish. As illustrated in FIG. 2C, liner polish 166 may form on cylinder liner 130 as a result of the hot combustion gases and fuel 164.

The number of components shown in FIGS. 2A-2C is provided for explanatory purposes. In practice, there may additional components, fewer components, different components, or differently arranged components than those shown in FIGS. 2A-2C.

Figure 3:
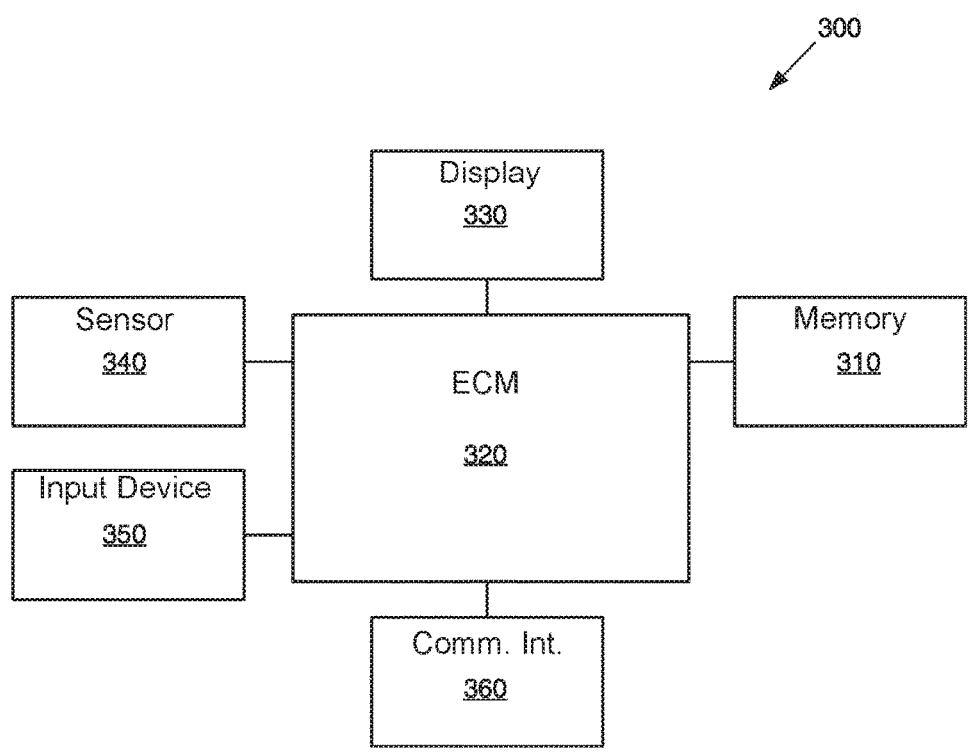
FIG. 3 is a diagram of example components of a system that may be used to determine liner polish and determine damage relating to the liner polish.

FIG. 3 is a diagram of example components of a system 300 that may be used to monitor and determine liner polish of cylinder liner 130 of FIG. 2B to determine damage to engine 100. In some embodiments, the example components may include a memory 310, an electronic control module (ECM) 320, a display 330, a sensor 340, an input device 350, and a communication interface 360. The example components of system 300 may be implemented using hardware, software, and/or a combination of hardware and software. In some implementations, the example components of system 300 may be interconnected using wired connections, wireless connections, and/or a combination of wired connections and wireless connections.

In some implementations, engine 100 and one or more of the example components of system 300 may be included in a machine. For example, engine 100, memory 310, ECM 320, display 330, sensor 340, input device 350 and/or communication interface 360 may be located in the machine. In some implementations, one or more of the example components of system 300 may be included in a back office. For example, memory 310, ECM 320, display 330, sensor 340, input device 350 and/or communication interface 360 may be located in the back office while engine 100 and sensor 340 may be located in the machine. In other words, memory 310, ECM 320, display 330, sensor 340, input device 350 and/or communication interface 360 may not be included in the machine.

Memory 310 may include a random access memory ("RAM"), a read only memory ("ROM"), and/or another type of dynamic or static storage device (e.g., a flash, magnetic, or optical memory) that stores information and/or instructions for use by the example components, such as ECM 320, to monitor and determine liner polish of cylinder liner 130 of FIG. 2B to determine damage to engine 100. Additionally, or alternatively, memory 310 may include non-transitory computer-readable medium or memory, such as a disc drive, flash drive, optical memory, read-only memory (ROM), or the like. In some implementations, with respect to the information and/or the instructions for use by the example components, memory 310 may store information (e.g., obtained in real-time or near real-time by sensor 340) regarding temperature(s) of engine 100, temperature(s) of piston 200, temperature(s) of components of piston 200 (e.g., temperature(s) of crown 210, rim 262, undercrown 230, etc.). Additionally, or alternatively, memory 310 may store information regarding one or more models as described in U.S. patent application Ser. No. 15/087,439 (incorporated herein by reference in its entirety). For example, the one or more models may include a combustion model, a heat flux model, a thermal model, and/or a damage model. In some implementations, memory 310 may store the information and/or the instructions in one or more data structures, such as one or more databases, tables, lists, trees, etc.

ECM 320 (or controller 320) may include any type of device or any type of component that may interpret and/or execute the information and/or the instructions stored within memory 310 to perform one or more functions. For example, ECM 320 may use the information and/or execute the instructions to monitor and determine liner polish of cylinder liner 130 to determine damage to engine 100 and/or components of piston 200. In some implementations, ECM 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.), and/or any other hardware and/or software.

In some embodiments, ECM 320 may obtain information from the example components and use the information to monitor and determine liner polish of cylinder liner 130 to determine damage to engine 100 and/or piston 200. For example, ECM 320 may obtain information from sensor 340 and/or from memory 310 and use the information to monitor and determine liner polish of cylinder liner 130 to determine damage to engine 100 and/or piston 200. In some implementations, ECM 320 may transmit, via a network (not shown), information regarding the liner polish of cylinder liner 130 and/or information regarding the damage to piston 200 to another device (e.g., at a back office system (not shown)) and/or another machine (not shown)). For example, ECM 320 may cause communication interface 360 to transmit the information regarding the liner polish of cylinder liner 130 and/or information regarding the damage to piston 200.

Display 330 may include any type of device or any type of component that may display information. For example, display 330 may display information regarding the liner polish of cylinder liner 130 and/or information regarding the damage to piston 200. In some implementations, display 330 may be a liquid crystal display (LCD), a light-emitting diode (LED) display, an organic light-emitting diode (OLED) display, and/or the like.

Sensor 340 may include any type of device(s) or any type of component(s) that may sense (or detect) information regarding engine 100 and/or piston 200. In some implementations, sensor 340 may be located at various portions of engine 100 and/or piston 200 to sense (or detect) information regarding engine 100 and/or piston 200. For example, the information regarding engine 100 and/or piston 200 may include a speed of engine 100 (e.g., a rotational speed of crankshaft 140), a mass of engine 100 (e.g., component(s) of engine 100), a fuel rate of engine 100, a load (or an amount of load) on engine 100 (e.g., based on the speed and/or the mass), a quantity of fuel 164 being injected into combustion chamber 160 during each combustion cycle, a timing of fuel 164 being injected (e.g., end of injection (EOI) or EOI timing), a geometry of fuel injector 162, a geometry of combustion chamber 160, a pressure of fuel 164 being injected during each combustion cycle, a velocity of fuel 164, a duration of injection of fuel 164, a flow rate of air entering combustion chamber 160 during each combustion cycle, air fuel ratio (e.g., a ratio of the air with respect to fuel 164) during each combustion cycle, a temperature of the air, a pressure of the air, parameters regarding the engine oil, a position of piston 200 (e.g., TDC or early timing, BDC or latter timing, etc.), a temperature of other components of engine 100 and/or piston 200 (e.g., crown 210, rim 262, etc.), a cylinder pressure (e.g., as piston 200 slides up and down cylinder bore 120 and cylinder liner 130) associated with piston 200, a cylinder force, a cylinder pressure load, and/or the like. In some implementations, EOI may refer to a start and/or an end injection of fuel 164. The parameters regarding the engine oil may include a temperature of the engine oil in passage 150 (e.g., the oil gallery) and/or other fluid of engine 100, an interval of changing the engine oil, an amount of time of use of the engine oil, a grade of the engine oil, and/or the like. In some implementations, sensor 340 may include a pressure sensor (e.g., to detect machine strut pressures), a force gauge, a load cell, a piezoelectric sensor, and/or the like. In some implementation, the load on engine 100 may be determined a load based on the speed and the fuel rate.

Input device 350 may include a component that permits a user to input information to one or more other components of the example components of system 300. For example, the information, input by the user, may include a preference (of the user) for a frequency for monitoring and/or for determining the liner polish of cylinder liner 130 and the damage to piston 200. Additionally, or alternatively, the information, input by the user, may include a manner (e.g., algorithm(s), parameters(s), etc.) for monitoring and/or determining the liner polish of cylinder liner 130 and/or the damage to piston 200. In some embodiments, input device 360 may include a keyboard, a keypad, a mouse, a button, a camera, a microphone, a switch, a touch screen display, and/or the like.

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

The number of components shown in FIG. 3 is provided for explanatory purposes. In practice, there may additional components, fewer components, different components, or differently arranged components than those shown in FIG. 3.

FIG. 4 is a flow chart of an example process 400 performed by the system of FIG. 3 for monitoring and determining liner polish of the piston of FIG. 2 to determine damage relating to the engine and/or the piston. In some implementations, one or more process blocks of process 400 may be performed by ECM 320. For example, ECM 320 may perform one or more process blocks of process 400 automatically (e.g., without intervention/input from a user). In some implementations, one or more process blocks of FIG. 4 may be performed by another device or a group of devices separate from or including ECM 320, such as device(s) at a remote location (e.g., a back office).

As shown in FIG. 4, process 400 may include receiving information for determining liner polish of cylinder liner 130 (block 410). For example, ECM 320 may receive liner polish information that ECM 320 may use with respect to determining the liner polish of cylinder liner 130. In some implementations, the liner polish information may be stored in memory 310 and ECM 320 may obtain the liner polish information from memory 310. Additionally, or alternatively, the liner polish information may be stored in another memory (similar to or different than memory 310) and ECM 320 may obtain the liner polish information from memory 310. Additionally, or alternatively, the liner polish information may be submitted by a user using input device 350 and ECM 320 may receive the liner polish information submitted by the user. Additionally, or alternatively, the liner polish information may be obtained by sensor 340 and ECM 320 may obtain the liner polish information from sensor 340.

In some implementations, the liner polish information may include an indication that liner polish is to be determined for engine 100. For example, the indication may submitted by a user using input device 350 and ECM 320 may receive the indication. Additionally, or alternatively, ECM 320 may obtain information from memory 310 and may identify the indication based on the information obtained from memory 310. In some implementations, the information from memory 310 may include a time interval for ECM 320 to determine an amount of damage to engine 100 relating to the liner polish of cylinder liner 130. For example, the time interval may indicate that ECM 320 is to determine the amount of damage to engine 100 at a frequency of 0.01 Hz to 100 Hz. The time interval may be expressed in other units of time measurement. For example, the time interval may indicate that ECM 320 is to determine amount of damage to engine 100 every second, every minute, every hour, and/or the like.

Additionally, or alternatively, the liner polish information may include piston and/or engine information regarding the components of piston 200 and/or the components of engine 100. For example, the piston and/or engine information (e.g., obtained in real-time or near real-time by sensor 340) may include information regarding the load on engine 100 (e.g., based on the speed and/or the mass), the quantity of fuel 164 being injected into combustion chamber 160 during each combustion cycle, the timing of fuel 164 being injected during each combustion cycle (e.g., end of injection (EOI)), the pressure of fuel 164 being injected during each combustion cycle, a velocity of fuel 164 during each combustion cycle, the duration of injection of fuel 164, the geometry of fuel injector 162, the geometry of combustion chamber 160, and/or the like. In some implementations, EOI may refer to a start and/or an end injection of fuel 164 and may be correlated with a position of piston 200 within cylinder liner (e.g., any position from a TDC position to a BDC position). Additionally, or alternatively, the piston and/or engine information may include information regarding an EOI limit. In some implementations, the EOI limit may be determined based on one or more experiments, field studies, analyses, simulations, and/or the like. Additionally, or alternatively, the piston and/or engine information may include physical parameters (e.g., geometry, shapes, sizes, contours, material properties such as coefficients of heat transfer, etc.) of the components, relationships (e.g., a compression ratio, a bore stroke, valve timings, etc.) between the components, and/or the like. Additionally, or alternatively, the piston and/or engine information may include information regarding various fluids (fuel, lubrication, coolant, engine oil, air, etc.) of piston 200 and/or engine 100. For example, the information regarding various fluids may include a makeup of the fluids, a concentration of the fluids, a quality of the fluids, other characteristics of the fluids, and/or the like.

As further show in FIG. 4, process 400 may include determining an end of injection factor (block 420). For example, ECM 320 may determine the end of injection (EOI) factor associated with engine 100 based on the liner polish information. For instance, ECM 320 may calculate the EOI factor based on information regarding the EOI and the EOI limit included in the liner polish information. In some implementations, ECM 320 may determine the EOI factor based on a relationship between EOI and EOI limits and based on a relationship between EOI and EOI factors. In this regard, ECM 320 may determine that the EOI factor is zero if the EOI is less than the EOI limit based on the relationship between EOI and EOI limits. Alternatively, ECM 320 may determine that the EOI factor is greater than zero if the EOI is greater than the EOI limit and may determine the EOI factor based on the relationship between EOI and EOI factors. The relationships being based on one or more experiments, field studies, analyses, simulations, and/or the like. For example, results of the one or more analyses, experiments, field study, simulations, and/or the like may identify a corresponding EOI factor for each EOI. Accordingly, based on the EOI and using the relationships, ECM 320 may determine the EOI factor corresponding to the EOI.

As further show in FIG. 4, process 400 may include determining a load factor (block 430). For example, ECM 320 may determine the load factor based on the liner polish information. For instance, ECM 320 may determine the load factor based on information regarding the load of engine 100 included in the liner polish information. In some implementations, ECM 320 may determine the load factor based on a relationship between engine loads and load factors, in a manner similar to that described above with respect to block 420.

As further show in FIG. 4, process 400 may include determining a liner polish rate (block 440). For example, ECM 320 may calculate the liner polish rate based on the load factor (determined in block 430), the EOI factor (determined in block 440), and air. In some implementations, ECM 320 may calculate the liner polish rate based on a mathematical combination of the load factor (determined in block 430), the EOI factor (determined in block 440), and air fuel ratio during combustion (e.g., as measured using and/or detected by sensor 340). For example, ECM 320 may calculate the polish rate using the following equation:

$$LPR(i)=LF(i)*EOIF(i)*AFRF \qquad \text{EQ. 1}$$

wherein:
  LPR is the liner polish rate,
  i is the current iteration,
  LF is the load factor,
  EOIF is the EOI factor, and
  AFRF is air fuel ratio during combustion.

In some implementations, ECM 320 may update the liner polish information (stored in memory 310 and/or another memory) based on the liner polish rate. In some implementations, the smaller air fuel ratio may be indicative of more fuel which may cause a higher damage risk.

As further show in FIG. 4, process 400 may include determining damage to engine 100 relating to liner polish (block 440). For example, ECM 320 may calculate an amount of damage to engine 100 relating to the liner polish of cylinder liner 130. In some implementations, ECM 320 may calculate the amount of damage to engine 100 based on a mathematical combination of the liner polish rate and one or more other factors. For example, ECM 320 may calculate the amount of damage to engine 100 using the following equation:

$$D(i)=D(i-1)+LPR(i)*\Delta t \qquad \text{EQ. 2}$$

wherein:
- i is the current iteration (of the calculation of the amount of damage to engine 100),
- D(i) is the amount of damage to engine 100 (or the current liner polish of cylinder liner 130),
- D(i−1) is the previous amount of damage to engine 100,
- LPR is the liner polish rate, and
- Δt is the amount of time between a current time and a time (prior to the current time) when the previous amount of damage to engine 100 was calculated (Δt may be based on or correspond to the time interval for ECM 320 to determine the liner polish of cylinder liner 130).

In some implementations, the amount of damage to engine 100 may correspond to the liner polish of cylinder liner 130 (or an amount of liner polish of cylinder liner 130). In some implementations, the previous amount of damage to engine 100 (or previous amount of liner polish of cylinder liner 130) may refer to an amount of damage up until the time (prior to the current time) when the previous amount of damage was calculated. In this regard, the amount of damage (or the current amount of damage) may refer to an additional amount of damage (or an additional amount of liner polish of cylinder liner 130 up until the current time. In some implementations, information identifying the previous damage and information identifying the time when the previous liner polish of cylinder liner 130 was calculated may be included in the liner polish information. In this regard, ECM 320 may determine the current time as a time to calculate the amount of damage based on the time interval and the time when the previous amount of damage was calculated. For example, ECM 320 may determine that the time interval has elapsed since the time when the previous amount of damage was calculated and, accordingly, determine that the current amount of damage is to be calculated at the current time. Additionally, or alternatively, ECM 320 may determine Δt based on the time interval and the time when the previous liner polish of cylinder liner 130 was calculated. Additionally, or alternatively, ECM 320 may determine Δt based on the current time and the time when the previous liner polish of cylinder liner 130 was calculated.

In some implementations, ECM 320 may update the liner polish information based on the amount of damage (or the current amount of damage). For example, ECM 320 may update the previous amount of damage with the current e amount of damage. Accordingly, the current amount of damage, included in the liner polish information (stored in memory 310 and/or another memory), may become the amount of damage.

In some implementations, ECM 320 may determine the amount of the damage to engine 100 as a percentage and may take remedial action if the amount of damage meets and/or exceeds a threshold (as will be described in more detail below). For example, if the amount of damage reaches 100 percent (100%), ECM 320 may consider the amount of damage to cause (or to have caused) a failure (e.g., of engine 100). In this regard, ECM 320 may determine a level of severity based on the amount of damage. In some implementations, ECM 320 may determine a relationship between a level of severity of damage and the load factor, the quantity of fuel 164 injected, and/or the position of piston 200. For example, ECM 320 may determine that the higher the quantity of fuel 164 injected and the latter the timing of piston 200 (e.g., piston 200 at or near BDC) may cause more liner polish and, consequently, may cause more damage to engine 100. In some implementations, ECM 320 may determine the amount of damage based on (or further based on) information regarding fuel 164, such as the quantity of fuel 164 being injected into combustion chamber 160 during each combustion cycle, the pressure of fuel 164 being injected during each combustion cycle, the velocity of fuel 164 during each combustion cycle, the duration of injection of fuel 164, and/or the like. Additionally, or alternatively, ECM 320 may determine the amount of damage based on (or further based on) parameters regarding the engine oil.

In some implementations, the various equations and associated elements, described herein, to determine the amount of damage to engine 100 may form an engine damage model. In this regard, the various equations are provided as example equations. In some implementations, the associated elements (and/or additional elements) may be used in different mathematical combinations and/or different equations to determine the amount of damage to the engine. In some implementations, the engine damage model may be included in the liner polish information.

As further show in FIG. 4, process 400 may include determining whether the damage exceeds a threshold (block 460). For example, ECM 320 may determine whether the amount of damage to engine 100 (determined in block 450) exceeds an engine damage threshold. In some implementations, the engine damage threshold may correspond to an amount of damage that may cause engine 100 to experience a failure or an amount of damage after which engine 100 may experience a failure.

As further shown in FIG. 4, if the damage exceeds the engine damage threshold (block 460—YES), then process 400 may include taking a remedial action (block 470). For example, if ECM 320 determines that the amount of damage to engine 100 (determined in block 450) exceeds the engine damage threshold, ECM 320 may take a remedial action. In some implementations, the remedial action may include causing information to be displayed via display 330. For example, the information may indicate that the amount of damage to engine 100 has exceeded the engine damage threshold and that engine may be damaged and/or may fail if engine 100 continues to be used (or, in other words, if engine 100 is not serviced). Additionally, or alternatively, the information may indicate that engine 100 is to be shut down or derated to prevent additional wear and/or damage to engine 100, that engine 100 is to be serviced, and/or the like. Additionally, or alternatively, the information may include instructions for servicing engine 100 (e.g., replacing and/or repairing engine 100), information identifying a location of liner polish, and/or the like. In some implementations, the information may be transmitted to a remote location (e.g., a back office system) and/or another device. For example, ECM 320 may cause the information to be transmitted to the remote location and/or the other machine. In some implementations, the information may enable characteristics/attributes of a similar engine (e.g, properties, geometry, shape, etc.) to be modified during manufacture so as to reduce a liner polish rate of a cylinder liner of an engine during similar operating conditions.

Additionally, or alternatively, the remedial action may include causing service instructions to be provided. Additionally, or alternatively, the remedial action may include causing service of engine 100 to be automatically scheduled.

Additionally, or alternatively, the remedial action may include may modify an operation of engine 100. For example, ECM 320 may cause engine 100 to slow down, decelerate, and/or be shut down to prevent additional damage to engine 100.

In some implementations, each remedial action described above may be associated with a respective amount of damage to engine 100 (with each amount of damage corresponding to a respective level of severity of damage to engine 100). Accordingly, ECM 320 may select a remedial action based on the amount of damage.

As further shown in FIG. 4, if the damage count does not exceed the engine damage threshold (block 460—NO), then process 400 may return to block 410. In some implementations, if the damage count does not exceed the engine damage threshold (block 460—NO), then process 400 may return to any one of block 410, block 420, block 430, block 440, or block 450.

INDUSTRIAL APPLICABILITY

The disclosed system may be used in any application where an increase in reliability of an engine and components of an engine is desire. The disclosed system may increase engine reliability by determining an amount of damage to engine 100 relating to the liner polish and taking a remedial action when the amount of damage exceeds a threshold. In some implementations, ECM 320 may determine the load factor, the EOI, the EOI limit, the liner polish rate, and/or the amount of damage to engine 100 in real-time or near real-time. In some implementations, ECM 320 may predict a time (e.g., date and/or time) when engine 100 may begin experiencing damage and/or when engine 100 may begin experience a failure based on one or more factors (e.g., the load factor, the EOI, the EOI limit, the liner polish rate, the time interval for ECM 320 to determine the amount of wear, the previous amount of wear, other information include in the liner polish information, a pattern of operation of engine 100, and/or the like). In this regard, as part of taking the remedial action, ECM 320 may cause information regarding the prediction to be displayed via display 330, may cause information indicating that engine 100 is to be serviced and/or replaced at or before the predicted time to be displayed via display 330, may cause engine 100 to replaced, cause a service of engine 100 to be scheduled, and/or the like. Additionally, or alternatively, ECM 320 may predict an EOI limit for an engine based on the damage model.

The disclosed system may have broad applicability. In particular, the system may be applicable to any type and design of an engine, and may be useful during design and/or selection of components within engine 100. For example, information associated with and performance parameters measured from an existing engine may be used by ECM 320 to simulate liner polish. The results of the simulation may then be used to design and/or select application-specific pistons. In addition, the system may provide information regarding the amount of damage to engine 100, and the information may remain accurate as engine 100 wears (as the liner polish information is updated based on wear conditions). In addition, the system may be useful across multiple configurations or platforms of engines. The disclosed concepts can be used during development of the engine components based on historic engine data, as desired. In particular, the disclosed concepts can be used to determine the status of the engine components given particular operating conditions. For example, based on a calculated amount of damage calculated for the engine components when exposed to the particular operating conditions, properties and/or geometry of the engine components can be changed so as to reduce the amount damage for the same components exposed to the same operating conditions.

It will be apparent to those skilled in the art that various modifications and variations can be made to the disclosed system. Other embodiments will be apparent to those skilled in the art from consideration of the specification and practice of the disclosed system. For example, it may be possible for engine 100 to not have cylinder liner 130, if desired, and for piston 200 to reciprocate directly within cylinder bores 120. Additionally, one or more of the parameters used to determine the amount of damage to engine 100 may vary based on one or more factors relating to engine 100, such as operating conditions, properties, shapes, sizes, contours, geometry, and/or the like. It is intended that the specification and examples be considered as exemplary only, with a true scope being indicated by the following claims and their equivalents.

No element, act, or instruction used herein should be construed as critical or essential unless explicitly described as such. While the present disclosure has been referring to monitoring or determining wear of a piston ring of a piston of an engine, one skilled in the art would appreciate that the present disclosure may similarly apply to monitoring or determining wear of one or more other engine components (including one or more of the engine components of engine 100 described above). In this regard, any reference to engine 100 may refer to engine 100 as a whole and/or one or more components of engine 100. Similarly, any reference to piston 200 may refer to piston 200 as a whole and/or one or more components of piston 200. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A control system for determining an amount of damage to an engine, the control system comprising: a memory configured to store liner polish information; and an electronic controller configured to: determine a load factor based on an amount of load on the engine; determine an end of injection factor associated with the engine; determine a liner polish rate based on the load factor and the end of injection factor; obtain, from the liner polish information stored in the memory, information identifying a previous amount of damage to the engine; determine an amount of time between a current time and a time when the previous amount of damage was calculated; calculate a current amount of damage to the engine based on the previous amount of liner polish, the amount of time, and the liner polish rate; and control taking of a remedial action, based on the current amount of damage when above a threshold, wherein electronic controller is configured to control a modification of an operation of the engine as the remedial action, and wherein, when controlling the modification of the operation of the engine, the electronic controller causes at least one of: the engine to decelerate, or the engine to shut down.

2. The control system of claim 1,
wherein the end of injection factor is based on an end of injection and an end of injection limit, and wherein the end of injection is associated with a position of a piston of the engine.

3. The control system of claim 2, wherein the position of the piston is a position from a top-dead-center (TDC) position and a bottom-dead-center (BDC) position during a combustion event.

4. The control system of claim 1, wherein the electronic controller is further configured to:
determine whether the current amount of damage exceeds an engine damage threshold, and
control the taking of the remedial action when the current amount of damage exceeds the engine damage threshold.

5. The control system of claim 1,
wherein the end of injection factor is based on an end of injection and an end of injection limit, and
wherein the end of injection is associated with a timing of injection of fuel.

6. The control system of claim 5, wherein information regarding the end of injection and the end of injection limit is stored in the liner polish information.

7. The control system of claim 1, further comprising a display,
wherein, when controlling the taking of the remedial action, the electronic controller causes information to be displayed via the display to a user, and
wherein the information, displayed to the user, includes:
information indicating that the current amount of damage has exceeded an engine damage threshold and that the engine is to fail if the engine continues to be used.

8. The control system of claim 1, further comprising a display,
wherein, when controlling the taking of the remedial action, the electronic controller causes information to be displayed via the display to a user, and
wherein the information, displayed to the user, includes at least one of:
information indicating that the engine is to be shut down or derated to prevent additional damage to the engine, or
information indicating that the engine is to be serviced.

9. A method for determining an amount of damage to an engine, the method comprising: determining, using an electronic controller, a load factor based on an amount of load on the engine; determining, using the electronic controller, an end of injection factor associated with the engine; determining, using the electronic controller, a liner polish rate based on the load factor and the end of injection factor; obtaining, using the electronic controller and from liner polish information stored in a memory, information identifying a previous amount of damage to the engine; calculating, using the electronic controller, an amount of time between a current time and a time when the previous amount of damage was calculated; calculating, using the electronic controller, a current amount of damage to the engine based on the previous amount of liner polish, the amount of time, and the liner polish rate; and controlling using the electronic controller, taking of a remedial action, based on the current amount of damage when above a threshold, wherein said controlling the taking of the remedial action includes modifying an operation of the engine, and wherein said modifying the operation of the engine includes at least one of: causing the engine to decelerate, or causing the engine to shut down.

10. The method of claim 9,
wherein the end of injection factor is based on an end of injection and an end of injection limit, and
wherein the end of injection is associated with a position of a piston of the engine.

11. The method of claim 10, wherein the position of the piston is a position from a top-dead-center (TDC) position and a bottom-dead-center (BDC) position during a combustion event.

12. The method of claim 9, further comprising:
determining whether the current amount of damage exceeds an engine damage threshold; and
said controlling the taking of the remedial action is performed when the current amount of damage exceeds the engine damage threshold.

13. The method of claim 9,
wherein the end of injection factor is based on an end of injection and an end of injection limit, and
wherein the end of injection is associated with a timing of injection of fuel.

14. The method of claim 13, further comprising obtaining information regarding the end of injection and the end of injection limit from the liner polish information.

15. The method of claim 9,
wherein said controlling the taking of the remedial action includes causing information to be displayed to a user, and
wherein the information, displayed to the user, includes at least one of:
information indicating that the current amount of damage has exceeded an engine damage threshold and that the engine is to fail if the engine continues to be used,
information indicating that the engine is to be shut down or derated to prevent additional damage to the engine, or
information indicating that the engine is to be serviced.

16. A machine comprising: a memory configured to store liner polish information; and an electronic controller configured to: determine a load factor based on an amount of load on the engine, determine an end of injection factor associated with the engine; determine a liner polish rate based on the load factor and the end of injection factor; obtain, from the liner polish information stored in the memory, information identifying a previous amount of damage to the engine; determine an amount of time between a current time and a time when the previous amount of damage was calculated; calculate a current amount of damage to the engine based on the previous amount of liner polish, the amount of time, and the liner polish rate; and control taking of a remedial action, based on the current amount of damage when above a threshold, wherein the electronic controller is configured to control a modification of an operation of the engine as the remedial action, and wherein, when controlling the modification of the operation of the engine, the electronic controller causes at least one of: the engine to decelerate, or the engine to shut down.

17. The machine of claim 16,
wherein the end of injection factor is based on an end of injection and an end of injection limit, and
wherein the end of injection is associated with a position of a piston of the engine.

18. The machine of claim 16,
wherein, when controlling the taking of the remedial action, the electronic controller causes information to be displayed via a display of the machine, and
wherein the information, displayed via the display, includes at least one of:
information indicating that the engine is to be shut down or derated, or
information indicating that the engine is to be serviced.

* * * * *